(12) United States Patent
Rider

(10) Patent No.: US 7,124,583 B2
(45) Date of Patent: Oct. 24, 2006

(54) GEOTHERMAL POWER GENERATOR

(75) Inventor: Nicholas Andrew Rider, Uniontown, PA (US)

(73) Assignee: Borealis Technical Limited(GI)

( * ) Notice: Subject to any disclaimer, the term of this patent is extended or adjusted under 35 U.S.C. 154(b) by 0 days.

(21) Appl. No.: 11/038,902

(22) Filed: Jan. 18, 2005

(65) Prior Publication Data

US 2005/0155350 A1    Jul. 21, 2005

Related U.S. Application Data

(60) Provisional application No. 60/537,602, filed on Jan. 19, 2004.

(51) Int. Cl.
*F03G 7/00* (2006.01)
(52) U.S. Cl. .................................................. 60/641.2
(58) Field of Classification Search ............... 60/641.2, 60/641.3, 641.4, 641.5
See application file for complete search history.

(56) References Cited

U.S. PATENT DOCUMENTS 3,911,683 A * 10/1975 Wolf .................... 60/641.2
4,047,093 A     9/1977  Levoy
4,189,923 A     2/1980  Berg
4,356,401 A    10/1982  Santi
4,851,183 A *  7/1989  Hampel ...................... 376/274
5,470,669 A * 11/1995  Ludwig et al. ............... 429/17
6,150,601 A    11/2000  Schnatzmeyer et al.
6,301,894 B1   10/2001  Halff
6,412,281 B1    7/2002  Cover
6,720,704 B1    4/2004  Tavkhelidze et al.

FOREIGN PATENT DOCUMENTS

WO      WO 99/13562     3/1999

* cited by examiner

*Primary Examiner*—Hoang Nguyen

(57) ABSTRACT

A Geothermal Power Generator which includes apparatus and method for the in-situ recovery of geothermal energy using thermionic or thermotunnelling converters. These are diode devices which produce electricity when a temperature gradient is applied across them. The electricity thus produced in a downhole environment is conducted to the surface where it can be used as an effective electrical source.

12 Claims, 1 Drawing Sheet

GEOTHERMAL POWER GENERATOR

CROSS-REFERENCE TO RELATED APPLICATIONS

This application claims the benefit of U.S. Provisional Application No. 60/537,602, filed Jan. 19, 2004.

BACKGROUND OF THE INVENTION

The invention relates to direct thermal-to-electric energy conversion systems for in situ recovery of underground geothermal energy.

High temperature geological areas, commonly referred to as geothermal areas, exist throughout the world. These areas are a natural source of heat that can be used to generate electricity. This can be done by drilling a hole or by making use of existing holes, both natural and artificial. There are a number of current systems, which utilize these areas to produce electricity, but there are several problems associated with them.

One system used is hydroelectric power—geothermal heat is used to heat up water to high temperatures, which produces steam to power turbines. This involves either using natural hot springs or pumping water down holes, bringing the water to the surface and setting up a generating system above ground. There are a lot of inefficiencies involved in this system as heat is lost along the way. It is costly to build and maintain, as there are many moving parts, all of which are subject to wear and tear. Furthermore, the circulating water (or other fluid) often dissolves large quantities of minerals and becomes very corrosive. The dissolved minerals also often precipitate out as the fluid escapes or is pumped from underground. The precipitating minerals can effectively plug the well. All of these systems also require that the fluid be vaporized at some point.

Prior art patents such as U.S. Pat. No. 6,301,894 to Halff and U.S. Pat. No. 4,189,923 to Berg have taken steps to avoid the problems associated with mineral buildup. Other systems use dry steam—steam from geothermal areas is used directly to power turbines. These methods avoid the problems that arise when water is used, but still necessitate the building of a generating system and the cost and time that this involves.

Systems have been invented to utilize the heat energy to produce electricity in a downhole environment, thus avoiding the need to bring heat to the surface, through liquid or any other medium, and avoiding the problems encountered with water as mentioned above. These systems use devices that can produce electricity by the simple application of heat to the device. The electricity produced in this way needs only to be conducted to the surface, where it can be used instantly. One prior art method of doing this involves thermoelectric devices. U.S. Pat. No. 6,150,601 to Schnatzmeyer et al., for example, refers to the use of thermoelectric devices to generate electricity in a downhole environment, both for the benefit of recharging battery packs and to generate an independent electricity supply. It should be noted that the electricity produced is "DC", so for "AC" applications a converter must me used, also, because of the nature of the device, some form of voltage control must be used. The transformer can be placed underground or above ground depending on if it if more beneficial to have it easily accessible or to boost the voltage near the source to increase transport efficiency.

This avoids many of the problems of previous systems, but has considerable drawbacks. Thermoelectric devices generate power by using special materials and configurations that force heat to push electrons from one side of the device to the other.

The biggest problem with thermoelectrics is that while heat pushes electrons in one direction, the material itself redistributes most of that heat through simple conduction. This means that most of the heat is not usefully harnessed, and instead flows through the system in all directions, reducing efficiency. Prior art patent U.S. Pat. No. 4,356,401 to Santi describes a thermo-electric power station supplied by a geothermal heat source. This system still requires liquid to be heated underground, necessitating the building of a geothermal system and a power station. Furthermore, the power station may have the problems associated with thermo-electrics mentioned above.

Similar ideas have been developed using thermionic systems as opposed to thermo-electric systems. These have the advantage of being far more efficient because there is a physical gap between two substrates, which prevents heat from returning to its source. However, prior art inventions involving thermionic systems are only able to function efficiently at very high temperatures, thus limiting the areas in which they can be used. Furthermore, prior art systems include expensive custom designed units fully encircling centralized heat pipes, such as patent U.S. Pat. No. 4,047,093 to Levoy.

Patent Application number WO99/13562 of Borealis Technical Limited describes a method for generating electricity from any heat source using thermotunneling converters. These are diode devices made by placing two materials very close to each other so that energetic electrons can tunnel from one material to the next. By tapping this electron flow, usable electric current can be extracted. The gap between the two materials ensures that the temperature differential between the two sides is maintained. It also allows current to flow in one direction only. Being that the most energetic electrons tunnel, heat is likely to be transferred from the hot side to the cold side along with the current. The gap acts as a heat sink and prevents the heat from being transferred by mere conduction.

This system has been shown to be extremely efficient and has the added advantage of being able to harness lower grade heat than both turbine systems and the annular prior art thermionic systems mentioned above. It also has the potential require no external mechanical or electrical power, thus allowing it to be completely self-sufficient.

BRIEF SUMMARY OF THE INVENTION

The present invention utilizes the efficiency of thermotunneling converters by providing an apparatus within which they can produce electricity in a downhole environment, using the heat energy found in geothermal areas.

This apparatus comprises: a vessel comprising a first surface thermally connected to a heat source and thermotunneling converters having a first surface thermally connected to a second surface of the vessel and a second surface thermally connected to a source of cool water.

The term "thermotunnelling converter" as used in this disclosure is defined as a gap diode device in which the separation of the electrodes is less than 100 nm. The device may generate electrical current by both thermionic transmission of electrons between the electrodes, thermotunneling transmission of electrons between the electrodes, or a combination of both.

In a preferred embodiment, the electrodes of the converter are able to be in very close proximity to each other because they are topologically matched—i.e., any surface deformations in one electrode are mirrored in the other electrode.

In another preferred embodiment, the separation of the electrodes is dynamically controlled through the use of active positioning elements, such as piezoelectric elements.

The vessel can either be filled with a thermally conductive fluid or it could be a solid heat spreader.

This invention solves many of the problems found in prior art. Thermotunnelling converters have the advantage of being far more efficient than present thermal-to-electric energy conversion systems, such as thermoelectric devices, and can also be used at a wide variety of temperatures. They may also be constructed inexpensively and reliably, and are resistant to vibration and shock. In addition, the present invention does not require a vaporization step. Any heat source, be it liquid, solid or gas, can be used, even if the temperature is well below 100 C.

A further advantage of the present system is that it utilizes the heat energy found in geothermal sources without needing the introduction of a fluid, thus providing greater efficiency and economical savings and reducing the likelihood that the system may eventually become blocked because of the buildup of minerals. The conversion of heat to energy happens at the heat source and both dry and wet heat sources can be used. It also involves no moving parts and will therefore have higher reliability and prolonged lifetime.

BRIEF DESCRIPTION OF THE SEVERAL VIEWS OF THE DRAWING

For a more complete explanation of the present invention and the technical advantages thereof, reference is now made to the following description and the accompanying drawing in which.

DETAILED DESCRIPTION OF THE INVENTION

Figure 1:
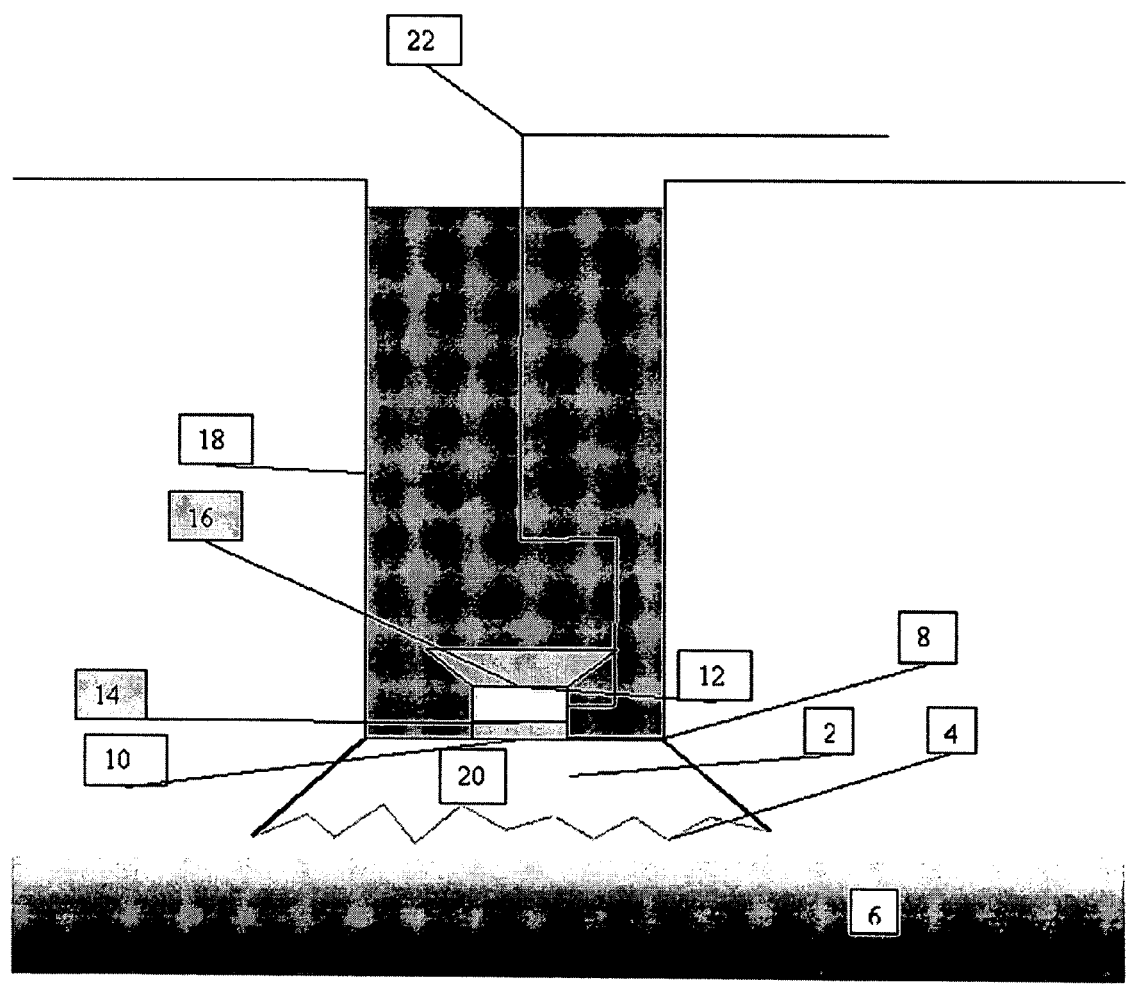
FIG. 1 is a vertical cross section of a first embodiment of the Geothermal Power Generator.

The Geothermal Power Generator provides a novel way for the in situ recovery of underground geothermal energy.

Referring now to FIG. 1, a preferred embodiment of the invention consists of a sealed vessel 2 located in a downhole environment with a first outer surface 4 in thermal contact with a heat source 6. First outer surface 4 of vessel 2 has dimensions that allow it sufficient surface area to conduct a significant amount of heat. First outer surface 4 of vessel 2 comprises a thermally conductive exterior, and can be made from any suitably conductive material, such as copper, aluminum, stainless steel or stainless steel alloys. Useful stainless steel alloys include those with nickel, molybdenum or tungsten. However, the invention is not limited to these specific materials.

All other outer surfaces of vessel 2 are made of an insulating material, with the exception of a small section 10 of the second surface 8 which is made from a thermally conductive material so that thermotunnelling converters 12 can be thermally connected to vessel 2 at that point.

Section 10 of second outer surface 8 of vessel 2 is thermally connected to the first surface 14 of one or more thermotunnelling converters. The second surface 16 of the one or more thermotunnelling converters 12 is thermally contacted with a heat sink 18. Section 10 comprises a thermally conductive exterior, and can be made from any suitably conductive material, such as copper, aluminium, stainless steel or stainless steel alloys. Useful stainless steel alloys include those with nickel, molybdenum or tungsten. However, the invention is not limited to these specific materials. In another embodiment, section 10 comprises a space, so that first surface 14 of thermotunnelling converters 12 can be in direct thermal contact with the hot water or other source of heat.

As mentioned, all second and subsequent surfaces of vessel 2 are insulated, to prevent heat from escaping into the heat sink and thus destroying the temperature differential. Any suitable insulating material can be used, although suitability may vary depending on the temperature of the heat source. Suitable materials include ceramics such as thoria, zirconia and foserite. However, the invention is not limited to these specific materials. At high temperatures, consideration must be given to the combination of ceramic and metal used, from the viewpoint of their chemical reactivity. For example, zirconia and thoria react with tantalum and molybdenum at temperatures above 1300° C. Foserite-molybdenum is a successful combination at this temperature.

The thermal conductivity of zirconia, unlike the other ceramics examined, decreases as the temperature decreases. This makes it useful for all temperature ranges. Foserite is useful at temperatures over 600° C. Thoria is only useful as a thermal insulator at very high temperatures (over 1000° C.).

The ceramics listed are useful for their good thermal expansion match to refractory metals, which is particularly important in ceramic-metal seals, and where a metal-ceramic bond must have integrity under thermal stress.

The inner region 20 of vessel 2 serves as a heat exchanger to pull heat from the heat source 6 to the section 10 of second outer surface 8 of vessel 2 which is thermally connected to the first surface 14 of the thermotunnelling converters 12. In one embodiment the vessel is filled with a thermally conductive fluid so heat passes through the vessel by convection currents. Any type of fluid material may be used that is substantially thermally conductive, such as liquid graphite, glycerine, pure water, brine, machine oil or mercury. However, the invention is not limited to these materials.

In an embodiment, which uses an underground source of hot water as a heat source, a circulation system may be fitted inside the vessel so that the hot water can be thermally contacted with the section 10 of outer surface 8 of vessel 2 which is thermally connected to the thermotunnelling converters 12. In this embodiment, first outer surface 4 may not be a solid piece of material but may comprise an open pipe system that draws the water up towards thermotunnelling converters 12. Methods for piping water are well known in the art. In another embodiment the vessel could sit inside the hot water with only the second outer surface 8 made out of an insulating material and exposed to the heat sink.

In another embodiment, a heat spreader is used instead of a fluid filled vessel and the thermotunnelling converters are thermally contacted with the heat spreader. In this embodiment the heat spreader is in thermal contact with the heat source (hot water or steam), but is covered with an insulating material so it does not come into contact with the heat sink. This embodiment has the advantage of heat transfer taking place via conduction, which is more efficient than via convection. The heat spreader could also be smaller than a fluid filled vessel and would then have the advantage of fitting into smaller spaces.

As mentioned above, the second surface 16 of the one or more thermotunnelling converters 12 is thermally contacted with a heat sink 18. In one embodiment this comprises a well of cool water located above the vessel. This ensures that the second surface of the thermotunneling converters 16 maintains a significantly cooler temperature than the first surface 14, thus providing a temperature differential across the thermotunneling converters. Any source of cool water would be suitable to provide a temperature differential for the thermotunneling converters. Suitable embodiments include a well, an underground water tank or finding another water source to pipe over the well. The temperature differential thus caused allows for the thermotunneling conductors to produce electricity, as explained in the prior art section.

Electrical attachment 22 is attached to thermotunnelling converters 12, and conducts the electricity produced by the thermotunnelling converters 12 to the surface. It is suitably insulated to enable it to pass through heat sink 18.

The system may be operated in the following way: A geothermal heat source 6 is provided. Vessel 2 is positioned in close proximity to heat source 6, such that first surface 4 of vessel 2 can be thermally contacted with heat source 6. One or more thermotunnelling converters 12 are connected to a section 10 of the second surface 8 of vessel 2. In a preferred embodiment, vessel 2 is filled with a thermally conductive fluid, such that the heat from heat source 6 is transported through the inner region 20 of vessel 2 by convection currents, applying heat to the first surface 14 of the one or more thermotunnelling converters 12. The second surface 16 of thermotunnelling converters 12 is thermally contacted with a heat sink 18. This creates a temperature differential across the one or more thermotunnelling converters which then produce electricity. Electrical attachment 22 is attached to thermotunnelling converters 12 and conducts the electricity to the surface.

This device allows for the production of electricity by the mere application of a temperature differential and is therefore ideal for using in a geothermal environment, where a natural heat source exists.

Suitable methods for conducting power to the surface are well known in the art.

This invention will naturally last longer and be more reliable than other prior art inventions because it utilizes the properties of natural resources and has no moving parts.

Thus it can be seen that the Geothermal Power Generator of the present invention provides an effective way of utilizing natural resources to produce electricity in a relatively cheap manner, using a highly reliable and long lasting system.

While the above description contains many specificities, these should not be construed as limitations on the scope of the invention, but rather as an exemplification of one preferred embodiment thereof. Many other variations are possible. For example, variations could be made in the shape of the generator, the shape and size of the thermotunneling converters, the fluid used and the location used. Accordingly, the scope of the invention should be determined not by the embodiments illustrated, but by the appended claims and their legal equivalents.

The invention claimed is:

1. An apparatus for generating electricity in a downhole environment comprising:
    (a) a vessel filled with a thermally conductive fluid having a first surface in thermal contact with a geothermal heat source,
    (b) one or more thermionic or thermotunnelling converters having a first surface in thermal contact with a second surface of said vessel and a second surface thermally connected to a source of cool water
    (c) said vessel having a funnel shape with a large open bottom end to let a circulation system to draw hot water into and through the vessel, the second and subsequent surfaces of said vessel comprising a thermally insulating material excluding said sections of said surfaces to which said thermionic or thermotunnelling converters are attached.

2. The apparatus of claim 1 wherein said thermally conductive fluid is selected from the liquids in the group consisting of: graphite, brine, glycerin, water, machine oil or mercury.

3. The apparatus of claim 1 wherein said thermally conductive fluid transports heat by convection to said first surface of said thennionic or thermotunnelling converters.

4. The apparatus of claim 1 wherein said geothermal heat source is an underground source of hot water.

5. The apparatus of claim 1 wherein beat is transported from said heat source to said first surface of said thermionic or thermotunnelling converters through said first surface of said vessel by means or conduction.

6. The apparatus of claim 1, wherein said source of cool water consists of a well or an underground tank system or an independent water source.

7. The apparatus of claim 1 wherein said first surface of said vessel is made of a thermally conductive material.

8. The apparatus of claim 7 wherein said thermally conductive material is selected from the group consisting of copper aluminum, stainless steel and stainless steel alloys.

9. The apparatus of claim 1 wherein said thermally insulating material is selected from the group consisting of thoria, zirconia and foserite.

10. The apparatus of claim 1 wherein said sections of said surfaces are comprised of a thermally conductive material.

11. The apparatus of claim 1 wherein said sections comprise a space so said first surface of said thermionic or thermotunnelling conducters is in direct thermal contact with said thermally conductive fluid.

12. The apparatus of claim 1 wherein an electrical attachment conducts the electricity produced by said thermionic or thermotunnelling converters to the surface.

* * * * *